(12) United States Patent
Kottmyer et al.

(10) Patent No.: US 6,276,137 B1
(45) Date of Patent: Aug. 21, 2001

(54) BRAKE MASTER CYLINDER WITH DUAL CHECK VALVE COMPENSATION THROUGH SECONDARY PISTON

(75) Inventors: Daniel Lee Kottmyer, Fairborn; John Benjamin Hageman, Vandalia; Kenneth Richard Hous, Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/483,114

(22) Filed: Jan. 14, 2000

(51) Int. Cl.$^7$ .............................. F15B 7/00; F16D 31/02
(52) U.S. Cl. ............................................. 60/591; 60/454
(58) Field of Search .......................... 60/453, 454, 585, 60/586, 588, 591

(56) References Cited

U.S. PATENT DOCUMENTS

| | | |
|---|---|---|
| 2,060,854 | 11/1936 | Carroll . |
| 2,174,615 | 10/1939 | Bowen et al. . |
| 3,355,887 | 12/1967 | Balster . |
| 4,455,831 | 6/1984 | Maehara . |
| 4,553,395 * | 11/1985 | Price et al. .............................. 60/562 |
| 4,998,950 | 3/1991 | Derrick . |
| 5,046,316 * | 9/1991 | Steffes et al. ....................... 60/454 X |
| 5,111,661 | 5/1992 | Savidan et al. . |
| 5,146,751 | 9/1992 | Savidan . |
| 5,542,253 | 8/1996 | Ganzel . |
| 5,937,649 * | 8/1999 | Barz et al. .............................. 60/566 |
| 6,113,365 * | 9/2000 | Siegel .................................. 60/453 X |

FOREIGN PATENT DOCUMENTS

| | | |
|---|---|---|
| 1215055 | 5/1968 | (GB) . |
| 2207967 | 2/1989 | (GB) . |

* cited by examiner

Primary Examiner—John E. Ryznic
(74) Attorney, Agent, or Firm—Robert M. Sigler

(57) ABSTRACT

A master cylinder provides separate flow paths through its secondary piston to provide greater fluid flow capacity from the reservoir to both the primary and secondary pressure chambers in response to the removal of brake fluid from the brake lines fed by the primary and secondary pressure chambers by a pump providing brake pressure for activation of one or more wheel brakes independently of the master cylinder. The secondary piston is provided with an axial fluid flow passage having check valves at each axial end permitting fluid flow only out of the axial fluid flow passage into the primary and secondary pressure chambers. A cross flow passage intersects the axial fluid flow passage between the primary and secondary check valves to communicate the axial fluid flow passage with the intermediate chamber and thus with the reservoir through the secondary compensation opening. The additional flow capacity to both pressure chambers provides improved reaction time for a traction control system at any wheel brake. Since the changes need only be made to the secondary piston, through standard parts and operations, costs are minimized. An additional advantage is the ability to change the primary and secondary seals of the master cylinder pistons to emphasize resistance to wear, since these seals no longer have to flex sufficiently to allow compensation of brake fluid into the pressure chambers. A single filter element may be added to the secondary piston to prevent particles from being carried by brake fluid through the axial fluid flow passage to the check valves.

5 Claims, 2 Drawing Sheets

BRAKE MASTER CYLINDER WITH DUAL CHECK VALVE COMPENSATION THROUGH SECONDARY PISTON

TECHNICAL FIELD

The technical field of this invention is vehicle brake master cylinders.

BACKGROUND OF THE INVENTION

A vehicle brake master cylinder provides control and routing of brake fluid flow to the individual wheel brakes. The master cylinder is typically provided with primary and secondary pistons, each providing brake fluid at an operator determined pressure from a separate portion of a brake fluid reservoir to a separate pair of brake mechanisms.

A particular function performed by the master cylinder is the control of fluid as required between each portion of the brake fluid reservoir and its assigned wheel brakes. This is accomplished with the assistance of bypass and compensation openings through the walls of the master cylinder housing between the brake fluid reservoir and the primary and secondary pressure chambers of the master cylinder. Bypass openings are located immediately in front of the primary seals on the primary and secondary pistons so that they are open to the appropriate wheel brakes with the pistons in their deactivated positions; and each thus permits replenishment of fluid in the brake lines in front of its associated piston to fill the volume between the piston and brake apply mechanisms in preparation for the next braking activation. Each bypass opening is passed by its associated primary seal almost immediately with activation of the piston to trap fluid in the brake lines and thus permit increase of braking pressure with further advance of the piston. A compensation opening is located behind the primary seal of each piston, even in the deactivated position of the piston, and maintains fluid volume behind the primary seal to prevent air from being pulled across the seal into the pressure chamber.

Such master cylinders may be used on vehicles provided with traction control or other systems capable of activating wheel brakes independently of the master cylinder and having a pump with an inlet open to the brake lines downstream of the master cylinder to provide brake fluid to the wheel brakes at the required pressure. In some modes of operation, such a pump can temporarily remove fluid from the brake lines at a rate which is greater than the flow capacity of the bypass opening, and/or the compensation opening across the seal, to replenish the fluid. In such vehicles, improved ability to flow fluid from the reservoir, through the master cylinder, to the traction control pump would help provide improved traction control response time. But it is not desirable to enlarge the bypass openings to provide the desired improved fluid flow, because a larger opening has a greater tendency to wear out or damage the seal that repeatedly slides over it. In addition, the seal construction tends to require a compromise between wear life and the ability to pass fluid downstream past the seal when required as described above; and a change in seal construction to permit greater fluid flow from the compensation opening past the seal into the brake lines may also cause a reduction in seal wear life.

SUMMARY OF THE INVENTION

The master cylinder of this invention provides separate flow paths through the secondary piston of an otherwise standard master cylinder to provide greater fluid flow capacity from the reservoir to both the primary and secondary pressure chambers in response to the removal of brake fluid from the brake lines fed by the primary and secondary pressure chambers by a pump providing brake pressure for activation of one or more wheel brakes independent of the master cylinder. The secondary piston is provided with an axial fluid flow passage having a primary check valve permitting fluid flow only out of the axial fluid flow passage into the primary pressure chamber and a secondary check valve permitting fluid flow only out of the axial fluid flow passage into the secondary pressure chamber. A cross flow passage is provided in the secondary piston intersecting the axial fluid flow passage between the primary and secondary check valves to communicate the axial fluid flow passage with the intermediate chamber and thus with the reservoir through the secondary compensation opening.

The first advantage of the master cylinder of this invention is improved reaction time for a traction control system, especially as applied to both the primary and secondary pressure chambers of a master cylinder, with changes only to the secondary piston of the master cylinder. An additional advantage is the ability to change the primary seals of both master cylinder pistons to emphasize resistance to wear, since these seals no longer have to fold down to allow compensation of brake fluid into the pressure chambers.

In a preferred embodiment, the axial fluid flow passage may be provided completely through the secondary piston, with an enlarged portion at each axial end receiving the check valve directed for outward flow only. At least one cross passage may extend radially through the piston from its outer surface to intersect the axial fluid flow passage. The additional operations on the secondary piston required to provide such construction comprise standard drilling and pressing operations, and the check valves may be off-the-shelf parts and/or self-contained assemblies for minimal cost.

DESCRIPTION OF THE PREFERRED EMBODIMENT

Figure 1:
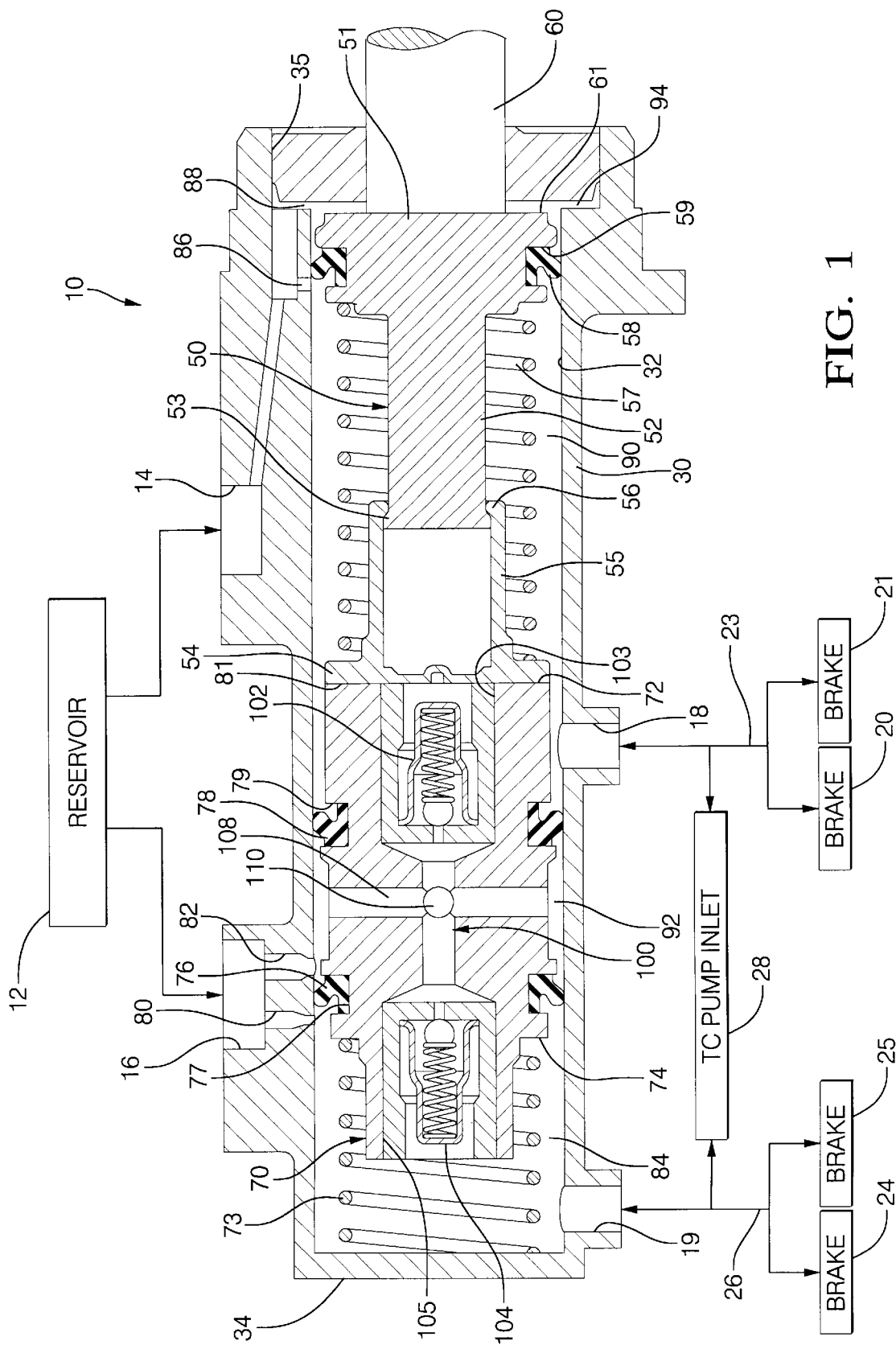
FIG. 1 shows a partially schematic and partially sectional diagram of a master cylinder according to the invention.

A brake master cylinder 10 suitable for a motor vehicle braking system is in fluid communication with a brake fluid reservoir 12 through primary reservoir inlet 14 and secondary reservoir inlet 16 and with a first set of brakes 20, 21 through a primary outlet 18 and a brake line 23 and with a second set of brakes 24, 25 through a secondary outlet 19 and a brake line 26. Brake lines 23 and 26 are also in fluid communication with a traction control (TC) pump inlet 28 that is part of a traction control system automatically controlling individual ones of brakes 20, 21, 24 and 25 associated with powered wheels of the vehicle to reduce sensed wheel spin upon vehicle acceleration. Such traction control systems are well known in the art; and their operation does not require further explanation except for their effect on master cylinder 10: during TC activation, the traction control pump exhausts brake fluid through inlet 28 from brake lines 23 and/or 26 at a significant rate; and this fluid must be replaced from reservoir 12 through master cylinder 10.

Master cylinder 10 comprises a cylindrical housing 30 defining an elongated bore 32 extending substantially its entire axial length. Housing 30 has a closed end 34 at the left in the FIG.; and bore 32 opens through open end 35 at the right in the FIG. Separate primary 50 and secondary 70 pistons are axially movable within bore 32. Primary piston 50 may comprise a two part construction with an input member 51 having an extending rod 52 coupled to spring compression member 54. A coil spring 57 biases members 51 and 54 axially apart, with relative extension limited by the engagement of a lip 53 on extending rod 52 of member 51 and a lip 56 on an extending cylindrical extension 55 of spring compression member 54. In the absence of a compressive axial force, spring 57 thus extends the members axially into the position shown. Member 51 also carries a primary seal 58, in the form of a lip seal made of a stiff, resilient material such as rubber, in a seal groove 59 near its input end. Primary seal 58 engages the inner surface of bore 32 completely around member 51. Primary piston 50 is shown in a deactivated position adjacent the extreme input axial end of master cylinder 10; and an input rod 60 applies operator induced input force on the input axial end 61 of primary piston 50 to activate it axially in an activating or downstream direction, to the left in the FIG. toward closed end 34. This input pressure may be boosted by a standard power brake booster in a manner known in the art. Primary piston 50 has an output axial end 81 for engagement with an input axial end 72 of secondary piston 70, so that activation of primary piston 50 by input rod 60 also provides activation of secondary piston 70.

A coil spring 73 is disposed between a flange 74 on secondary piston 70 and closed end 34 within housing 30. Spring 73 positions secondary piston 70, as well as primary piston 50, in an inactivated position as shown in the absence of opposing pressure from input rod 60 moving them toward closed end 34. Secondary piston 70 carries a primary seal 76 in a seal groove 77 and a secondary seal 78 in a seal groove 79. Each of seals 76 and 78 engages the inner surface of bore 32 entirely around secondary piston 70. In the inactivated position of secondary piston 70 as shown, front secondary seal 76 is positioned between a secondary bypass opening 80 and a secondary compensation opening 82, both of which communicate reservoir 12 with bore 32 through secondary reservoir inlet 16. Primary seal 76 on secondary piston 70 defines a secondary pressure chamber 84 in bore 32 adjacent the closed end 34; and, in the inactivated position of secondary piston 70, secondary bypass opening 80 is positioned just downstream from primary seal 76, so that fluid from reservoir 12 is free to fill secondary pressure chamber 84 as required. When secondary piston 70 is activated, primary seal 76 passes over secondary bypass opening 80 almost immediately upon the initiation of activation to close secondary pressure chamber 84 from reservoir 12 so that braking pressure may be maintained therein. When secondary piston 70 returns to its inactivated position, seal 76 once again slides past secondary bypass opening 80. Secondary bypass opening 80 is small in cross-sectional area, at least in part to reduce wear on primary seal 76 as it repeatedly slides over the edge of opening 80 during brake activations and deactivations.

Similarly, in the inactivated position of primary piston 50 as shown, primary seal 58 is positioned between a primary bypass opening 86 and a primary compensation opening 88, both of which communicate reservoir 12 with bore 32. Primary seal 58 on primary piston 50 and secondary seal 78 on secondary piston 70 define a primary pressure chamber 90 therebetween in bore 32; and, in the inactivated position of primary piston 50, primary bypass opening 86 is positioned just downstream from primary seal 58, so that fluid from reservoir 12 is free to fill primary pressure chamber 90 as required. When primary piston 50 is activated and deactivated, primary seal 58 slides over primary bypass opening 86 in a similar manner to that of primary seal 76 on secondary piston 70 as described above; and primary bypass opening 86 is thus made small in cross-sectional area at least in part to reduce wear on primary seal 58.

Secondary compensation opening 82, provided upstream of secondary bypass opening 80 and primary seal 76 on secondary piston 70, permits flow of brake fluid between reservoir 12 and an intermediate chamber 92 of bore 32 defined between the primary and secondary seals 76 and 78 on secondary piston 70. Likewise, compensation opening 88, provided upstream of primary bypass opening 86 and the primary seal 58 on primary pressure piston 50, permits flow of brake fluid between reservoir 12 and a rear chamber 94 defined in bore 32 upstream of primary seal 58 on primary piston 50. Compensation opening 82 ensures that, should the pressure in secondary pressure chamber 84 fall below that in intermediate chamber 92, and thus in reservoir 12, brake fluid rather than air will be drawn past primary seal 76 from intermediate chamber 92 into secondary pressure chamber 84. Compensation opening 88 performs the same function for fluid flow past primary seal 58 on primary pressure piston 50 from rear chamber 94 into primary pressure chamber 90 at a lower pressure.

When the traction control system of the vehicle on which master cylinder 10 is provided activates its pump to apply a wheel brake, the pump will draw brake fluid from the brake line or lines through pump inlet 28 at a rapid rate. In the system shown herein, the fluid will be drawn from both lines 23 and 26 and thus from both primary pressure chamber 90 and secondary pressure chamber 84. The full volume of fluid required must be drawn from reservoir 12, without the assistance of primary and secondary pressure chambers, through primary and secondary bypass openings 80 and 86 and through primary and secondary compensation openings 88 and 82 past primary and secondary seals 58 and 76, respectively. But each of these flow paths is restricted to reduce wear on the primary seals. The bypass openings themselves have small, restrictive cross-sectional areas; and, although the compensation openings are large enough to supply the flow, flow therethrough is restricted on its way to the primary and secondary pressure chambers by the primary seals which must be forced out of the way for such flow to take place.

Thus, secondary piston 70 is provided with means for supplying the high flow required by a brake activating pump having an inlet 28 open to brake lines 23 and 26, regardless of which wheel brake is being activated by the system including the pump. An axial fluid flow passage 100 is provided through secondary piston 70; and fluid flow therethrough is controlled by a pair of check valves each allowing fluid flow only out of the piston: a primary check valve 102 in an enlarged portion 103 of axial fluid flow passage 100 at the upstream end thereof permitting fluid flow out of the passage into primary pressure chamber 90 and a secondary check valve 104 in an enlarged portion 105 of axial fluid flow passage 100 at the downstream end thereof permitting fluid flow out of the passage into secondary pressure chamber 84. Each of check valves 102 and 104 is normally closed by a spring as shown in any position of the piston except when it is opened against the spring force by a fluid pressure difference across the movable valve element in the appropriate direction. To complete the flow paths, a cross flow passage 108, which may be drilled radially across the piston as shown, intersects axial fluid flow passage 100 in a central portion thereof 110 between the check valves 102 and 104 to communicate axial fluid flow passage 100 with intermediate chamber 92 of bore 32 and thus with reservoir 12 through the secondary compensation opening 82. Secondary compensation opening 82 is made large enough to handle the required flow from reservoir 12 to both brake lines 23 and 26. Axial flow passage 100 and cross flow passage 108 are both formed in secondary piston 70 in standard operations, with the enlarged ends of axial flow passage 100 formed from each axial end. Both check valves 102 and 104 may be standard parts, with each pressed into an enlarged axial end of axial flow passage 100. Thus, no change is required for primary piston 50 to obtain the required increased brake fluid flow through an inactivated master cylinder through both the primary and secondary pressure chambers. In addition, since flexing of the primary and secondary seals sufficient for fluid flow therepast is no longer required, both of these seals may be designed, in materials and construction, to provide greater resistance to wear, which was generally compromised by the compensation flow requirement.

Figure 2:
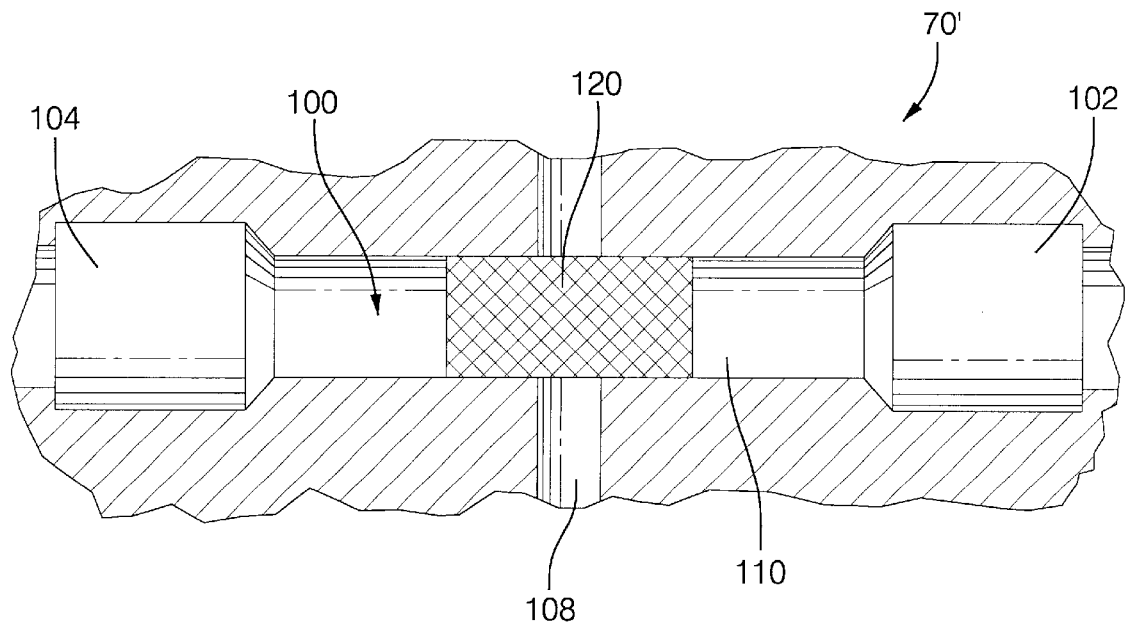
FIG. 2 is an enlarged portion of FIG. 1 showing, in schematic form, an alternate embodiment having a filter in the secondary piston.
Figure 3:
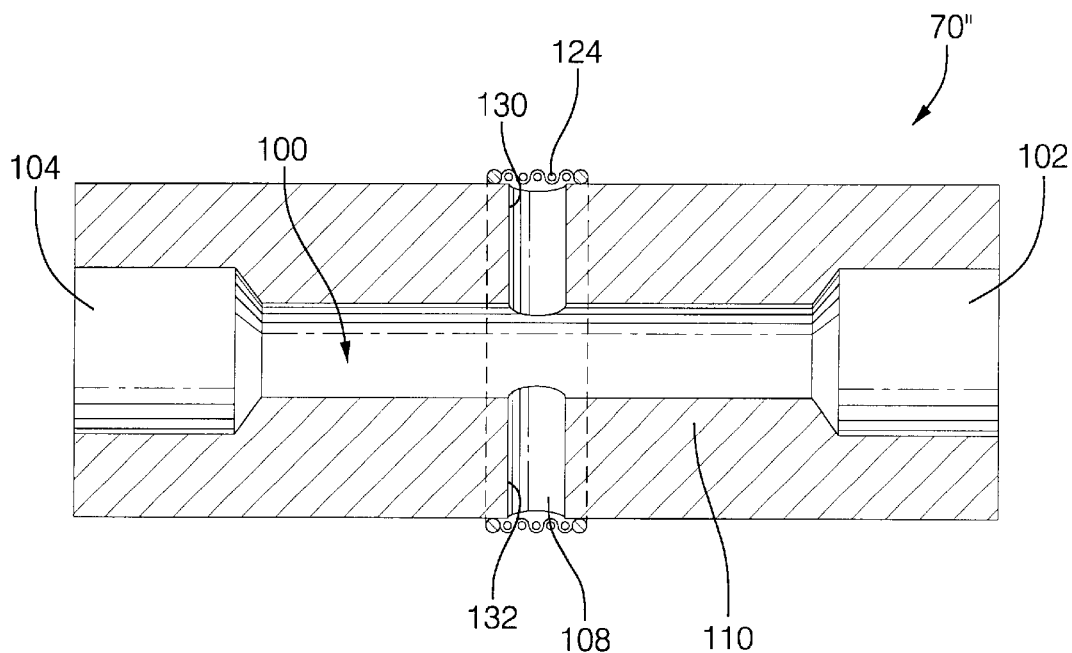
FIG. 3 is an enlarged portion of FIG. 1 showing, in schematic form, an alternate embodiment having a filter in the secondary piston.

The apparatus of this invention allows a single filter element added to secondary piston 70 to prevent contaminant particles in the brake fluid from reaching either of check valves 102 and 104, thus still confining all added parts to the secondary piston. FIGS. 2–3 are enlarged portions of FIG. 1 showing several variations of such a filter. In FIG. 2, a single, internal filter element 120 is added to secondary piston 70' in central portion 110 of axial fluid flow passage 100 at its intersection with cross flow passage 108. Filter element 120 prevents contaminating particles from entering either of check valves 102 and 104, regardless of the number of cross flow passages 108 provided. Of course, such internal filter elements could alternatively be added as required in cross flow passage(s) 108. In FIG. 3, a single annular mesh filter element 124 surrounds secondary piston 70", as indicated by the dashed (hidden) lines so as to cover any openings 130, 132 in secondary piston 70" from one or a plurality of cross flow passages 108 and thus prevent contaminating particles from entering the passages.

What is claimed is:

1. A brake master cylinder comprising, in combination:

a cylinder defining a bore;

a primary piston in the bore having a primary seal thereon;

a secondary piston in the bore downstream of the primary piston in the direction of brake activation and having a primary seal and a secondary seal thereon;

a primary pressure chamber defined in the bore between the primary seal on the primary piston and the secondary seal on the secondary piston and being in fluid communication with a first brake;

a secondary pressure chamber defined in the bore downstream of the primary seal on the secondary piston and being in fluid communication with a second brake;

an intermediate chamber defined in the bore between the primary seal on the secondary piston and the secondary seal on the secondary piston;

the cylinder having a primary bypass opening downstream of the primary seal on the primary piston with the primary piston in an inactivated position, a primary compensation opening upstream of the primary bypass opening and the primary seal on the primary piston, a secondary bypass opening downstream of the primary seal on the secondary piston with the secondary piston in an inactivated position, and a secondary compensation opening upstream of the secondary bypass opening and the primary seal on the secondary piston, each of the primary and secondary bypass openings and the primary and secondary compensation openings communicating with the reservoir;

the primary seal on the primary piston passing over the primary bypass opening with activation of the primary piston from its inactivated position;

the primary seal on the secondary piston passing over the secondary bypass opening with activation of the secondary piston from its inactivated position;

the secondary piston having an axial fluid flow passage with a primary check valve permitting fluid flow only out of the axial fluid flow passage into the primary pressure chamber and a secondary check valve permitting fluid flow only out of the axial fluid flow passage into the secondary pressure chamber;

a cross flow passage in the secondary piston intersecting the axial fluid flow passage between the primary and secondary check valves to communicate the axial fluid flow passage with the intermediate chamber and thus with the reservoir through the secondary compensation opening, and a filter element carried by the secondary piston in the path of brake fluid flowing through the axial flow passage so as to prevent particles from being carried by the brake fluid to either of the primary and secondary check valves, the filter element being an internal filter element disposed in the axial fluid flow passage and spanning the intersection thereof with the cross flow passage.

2. A brake master cylinder comprising, in combination:

a cylinder defining a bore;

a primary piston in the bore having a primary seal thereon;

a secondary piston in the bore downstream of the primary piston in the direction of brake activation and having a primary seal and a secondary seal thereon;

a primary pressure chamber defined in the bore between the primary seal on the primary piston and the secondary seal on the secondary piston and being in fluid communication with a first brake;

a secondary pressure chamber defined in the bore downstream of the primary seal on the secondary piston and being in fluid communication with a second brake;

an intermediate chamber defined in the bore between the primary seal on the secondary piston and the secondary seal on the secondary piston;

the cylinder having a primary bypass opening downstream of the primary seal on the primary piston with the primary piston in an inactivated position, a primary compensation opening upstream of the primary bypass opening and the primary seal on the primary piston, a secondary bypass opening downstream of the primary seal on the secondary piston with the secondary piston in an inactivated position, and a secondary compensation opening upstream of the secondary bypass opening and the primary seal on the secondary piston, each of the primary and secondary bypass openings and the primary and secondary compensation openings communicating with the reservoir;

the primary seal on the primary piston passing over the primary bypass opening with activation of the primary piston from its inactivated position;

the primary seal on the secondary piston passing over the secondary bypass opening with activation of the secondary piston from its inactivated position;

the secondary piston having an axial fluid flow passage with a primary check valve permitting fluid flow only out of the axial fluid flow passage into the primary pressure chamber and a secondary check valve permitting fluid flow only out of the axial fluid flow passage into the secondary pressure chamber;

a cross flow passage in the secondary piston intersecting the axial fluid flow passage between the primary and secondary check valves to communicate the axial fluid flow passage with the intermediate chamber and thus with the reservoir through the secondary compensation opening, and a filter element carried by the secondary piston in the path of brake fluid flowing through the axial flow passage so as to prevent particles from being carried by the brake fluid to either of the primary and secondary check valves, the filter element being an annular external filter element surrounding a portion of the secondary piston and axially aligned therewith so as to cover the opening of any cross flow passage therefrom.

3. A brake master cylinder comprising, in combination:

a cylinder defining a bore;

.a primary piston in the bore having a primary seal thereon;

a secondary piston in the bore downstream of the primary piston in the direction of brake activation and having a primary seal and a secondary seal thereon;

a primary pressure chamber defined in the bore between the primary seal on the primary piston and the secondary seal on the secondary piston and being in fluid communication with a first brake;

a secondary pressure chamber defined in the bore downstream of the primary seal on the secondary piston and being in fluid communication with a second brake;

an intermediate chamber defined in the bore between the primary seal on the secondary piston and the secondary seal on the secondary piston;

the cylinder having a primary bypass opening downstream of the primary seal on the primary piston with the primary piston in an inactivated position, a primary compensation opening upstream of the primary bypass opening and the primary seal on the primary piston, a secondary bypass opening downstream of the primary seal on the secondary piston with the secondary piston in an inactivated position, and a secondary compensation opening upstream of the secondary bypass opening and the primary seal on the secondary piston, each of the primary and secondary bypass openings and the primary and secondary compensation openings communicating with the reservoir;

the primary seal on the primary piston passing over the primary bypass opening with activation of the primary piston from its inactivated position;

the primary seal on the secondary piston passing over the secondary bypass opening with activation of the secondary piston from its inactivated position;

the secondary piston having an axial fluid flow passage with a primary check valve permitting fluid flow only out of the axial fluid flow passage into the primary pressure chamber and a secondary check valve permitting fluid flow only out of the axial fluid flow passage into the secondary pressure chamber, each of the check valves being normally closed regardless of the position of the primary piston and the secondary piston but openable in response to fluid pressure exerted in a predetermined direction; and a cross flow passage in the secondary piston intersecting the axial fluid flow passage between the primary and secondary check valves to communicate the axial fluid flow passage with the intermediate chamber and thus with the reservoir through the secondary compensation opening.

4. The brake master cylinder of claim 3 in which the axial fluid flow passage extends from the upstream end of the secondary piston to the downstream end thereof, the primary check valve is disposed in an enlarged portion of the axial fluid flow passage at the upstream end thereof and the secondary check valve is disposed in an enlarged portion of the axial fluid flow passage at the downstream end thereof.

5. The brake master cylinder of claim 3 further comprising a filter element carried by the secondary piston in the path of brake fluid flowing through the axial fluid flow passage so as to prevent particles from being carried by the brake fluid to either of the primary and secondary check valves.

\* \* \* \* \*